(12) United States Patent
Kitano et al.

(10) Patent No.: US 6,919,410 B2
(45) Date of Patent: Jul. 19, 2005

(54) PROCESS FOR PRODUCING MODIFIED POLYPROPYLENE RESIN

(75) Inventors: Katsuhisa Kitano, Ichihara (JP); Takashi Sanada, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 90 days.

(21) Appl. No.: 10/278,982

(22) Filed: Oct. 24, 2002

(65) Prior Publication Data

US 2003/0119996 A1 Jun. 26, 2003

(30) Foreign Application Priority Data

Dec. 6, 2001 (JP) ........................................ 2001-372867

(51) Int. Cl.⁷ ................................................. C08F 8/32
(52) U.S. Cl. ........................ 525/263; 525/120; 525/184; 525/285; 525/286; 525/301; 525/333.8; 525/382
(58) Field of Search ................................ 525/120, 184, 525/263, 285, 286, 301, 382, 333.8, 126, 133, 379, 387, 385, 386

(56) References Cited

U.S. PATENT DOCUMENTS

| | | | |
|---|---|---|---|
| 4,146,590 A | * 3/1979 | Yamamoto et al. | ......... 525/168 |
| 4,550,130 A | 10/1985 | Kishida et al. | |
| 4,720,516 A | 1/1988 | Kishida et al. | |
| 4,727,120 A | 2/1988 | Nogues | |
| 4,822,688 A | 4/1989 | Nogues | |
| 5,218,048 A | 6/1993 | Abe et al. | |
| 6,046,279 A | * 4/2000 | Roberts et al. | ............. 525/285 |
| 6,323,289 B1 | * 11/2001 | Hogt et al. | ................. 525/387 |
| 6,569,950 B2 | * 5/2003 | Kitano et al. | ............... 525/285 |

FOREIGN PATENT DOCUMENTS

| | | |
|---|---|---|
| JP | 58-204043 A | 11/1983 |
| JP | 60-149635 A | 8/1985 |
| JP | 61-113675 A | 5/1986 |
| JP | 63-205342 A | 8/1988 |
| JP | 3-227369 A | 10/1991 |
| JP | 11-286582 A | 10/1999 |

OTHER PUBLICATIONS

Hackh's Chem. Dictionary, 4th ed., Mc–Graw–Hill, N.Y., p. 668 (1969).*
Seymour et al., Polymer Chemistry, 2nd ed., Marcel Dekker, N.Y., pp. 637, 644 (1988).*

* cited by examiner

*Primary Examiner*—Fred Teskin
(74) *Attorney, Agent, or Firm*—Sughrue Mion, PLLC

(57) ABSTRACT

There is provided a process for producing a modified polypropylene resin, which comprises the steps of mixing the following components (A) to (D), and reacting them with one another:

(A) 100 parts by weight of a polypropylene resin,
(B) 0.1 to 30 parts by weight of a compound having a bond or a functional group selected from the group consisting of a non-aromatic carbon-carbon multiple bond, an oxirane group and a derived carboxyl group,
(C) 0.001 to 30 parts by weight of a compound having at least two functional groups reactive to a carboxyl group, and
(D) 0.01 to 20 parts by weight of an organic peroxide having a decomposition temperature of from 50 to 120° C., at which temperature a half-life of the organic peroxide is 1 minute.

4 Claims, No Drawings

PROCESS FOR PRODUCING MODIFIED POLYPROPYLENE RESIN

FIELD OF THE INVENTION

The present invention relates to a process for producing a modified polypropylene resin. More specifically, the present invention relates to a process for producing a modified polypropylene resin, which has high impact strength and melt tension without detriment to physical properties such as stiffness.

BACKGROUND OF THE INVENTION

In order to improve processability, impact strength and other physical properties of a resin, the following methods 1 and 2 are known.

1. A method of irradiating an electron beam to a resin is known. According to this method, melt tension of the resin can be increased. However, the method has problems, (1) since a thickness of the resin through which the electron beam passes is limited, productivity is low, and (2) since an electron beam irradiation apparatus is expensive, a production cost is high.
2. A method of (1) introducing a carboxyl group into a polypropylene resin in the presence of an organic peroxide to obtain a carboxyl group-carrying polypropylene resin, and then (2) reacting the carboxyl group-carrying polypropylene resin with a compound having at least two functional groups in the same molecule (JP-A 3-227369). However, the method has a problem that the organic peroxide causes unfavorable reactions such as oxidation and decomposition of the polypropylene resin, Therefore, a method for improving processability, impact strength and other physical properties without problems as described above has been desired.

SUMMARY OF THE INVENTION

An object of the present invention is to provide a process for producing a modified polypropylene resin, which has high impact strength and melt tension without detriment to physical properties such as stiffness.

The present invention provides a process for producing a modified polypropylene resin, which comprises the steps of mixing the following components (A) to (D), and reacting them with one another:

(A) 100 parts by weight of a polypropylene resin,
(B) 0.1 to 30 parts by weight of a compound having a bond or a functional group selected from the group consisting of a non-aromatic carbon-carbon multiple bond, an oxirane group and a derived carboxyl group,
(C) 0.001 to 30 parts by weight of a compound having at least two functional groups reactive to a carboxyl group, and
(D) 0.01 to 20 parts by weight of an organic peroxide having a decomposition temperature of from 50 to 120° C., at which temperature a half-life of the organic peroxide is 1 minute.

DETAILED EXPLANATION OF THE INVENTION

The "polypropylene resins" (component (A)) used in the present invention means a propylene homopolymer; a random copolymer of propylene and ethylene, which copolymer has 50 to 99.9% by weight of a polymerized propylene unit (said unit is hereinafter referred to as "propylene unit"); a random copolymer of propylene and an α-olefin having 4 to 12 carbon atoms, which copolymer has 50 to 99.9% by weight of a propylene unit: a block copolymer comprising a propylene homopolymer segment and a propylene-ethylene random copolymer segment, which block copolymer has 50 to 99.9% by weight of a propylene unit; or a mixture comprising at least two of these polymers.

The component (A) may be used in combination with a polyethylene resin such as an ethylene homopolymer and an ethylene-α-olefin random copolymer; rubber; or a modified polyolefin resin.

Examples of the above-mentioned α-olefin are 1-butene, 1-pentene, 2-methyl-1-propene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1pentene, propyl-1-pentene diethyl-1-butene, 1-nonene, 1-decene, 1-undecene and 1-dodecene. Among them, preferable are 1-butene, 1-pentene, 1-hexene and 1-octene.

A process for producing the component (A) is not particularly limited. Examples thereof are a solution polymerization process, a slurry polymerization process, a bulk polymerization process, a gas phase polymerization process, and a combination thereof (JP-A 3-94295 and JP-A 61-287917). A polymerization catalyst used for the above polymerization processes may be one known in the art, and preferable are (i) a multi-site catalyst obtained by using a solid catalyst component containing a titanium atom, a magnesium atom and a halogen atom, and (ii) a single-site catalyst obtained by using a catalyst component such as a metallocene complex.

As the component (B) used in the present invention, the following compounds (1) to (4) are exemplified. Of these, the compound (4) is preferred.

(1) Compounds having only a non-aromatic carbon-carbon multiple bond.
(2) Compounds having only an oxirane group.
(3) Compounds having only a derived carboxyl group.
(4) Compounds having (i) at least one bond or at least one functional group selected from the group consisting of a non-aromatic carbon-carbon multiple bond, an oxirane group and a derived carboxyl groups, and (ii) at least one functional group, which is different from the above functional group (i), selected from the group consisting of a derived carboxyl group, a derived hydroxyl group, a derived amino group, a derived silyl group, a derived mercapto group and a derived sulfonic acid group.

The above-mentioned "derived carboxyl group" means a group derived from a carboxyl group (—COOH), which is represented by the following formulas:

In the formulas, $R_3$ is a hydrogen atom, an alkyl group or ah aryl group, which groups may be substituted with or substituted with an inert group: X is a halogen atom; $R_4$ and $R_5$ are each a hydrogen atom, an alkyl group or an aryl group, which groups may be substituted with or unsubstituted with an inert group: Y is an oxygen atom or NH; and a preferred carbon atom number of the alkyl group represented by $R_3$, $R_4$ and $R_5$ is from 1 to 10, and that of the aryl group represented thereby is from 6 to 10.

The above-mentioned "derived hydroxyl group" means a group derived from a hydroxyl group (—OH), which is represented by the following formulas:

—$OR_4$, —$OCOR_5$, or —$OSi(R_6)_3$,

In the formulas, $R_4$ and $R_5$ are the same as those mentioned above; and three $R_6$'s may be the same or different, and are each a $C_1$ to $C_{10}$ alkyl group, a $C_6$ to $C_{10}$ aryl group or a $C_1$ to $C_{10}$ alkoxy group, which groups may be substituted with or unsubstituted with an inert group.

The above-mentioned "derived amino group" means a group derived from an amino group (—$NH_2$), which is represented by the following formulas:

—$NHR_7$ or —$NHCOR_8$,

In the formulas, $R_7$ is a hydrogen atom, a cyano group, a $C_1$ to $C_{10}$ alkyl group or a $C_6$ to $C_{10}$ aryl group, which groups may be substituted with or unsubstituted with an inert group; and $R_8$ is a hydrogen atom, a $C_1$ to $C_{10}$ alkyl group or a $C_6$ to $C_{10}$ aryl group, which groups may be substituted with or unsubstituted with an inert group.

The above-mentioned "derived silyl group" means a group derived from a silyl group (—$SiH_3$), which is represented by the following formula:

—$Si(R_9)_3$,

In the formula, three $R_9$'s may be the same or different, and are each a hydrogen atom, a $C_1$ to $C_{10}$ alkyl group, a $C_6$ to $C_{10}$ aryl group or a $C_1$ to $C_{10}$ alkoxy group, which groups may be substituted with or unsubstituted with an amino group or a mercapto group.

The above-mentioned "derived mercapto group" means a group derived from a mercapto group (—SH), which is represented by the following formulas:

—$SR_{10}$ or —$SCOR_{11}$,

In the formulas, $R_{10}$ and $R_{11}$ are each a hydrogen atom, a $C_1$ to $C_{10}$ alkyl group or a $C_6$ to $C_{10}$ aryl group, which groups may be substituted with or unsubstituted with an inert group.

The above-mentioned "derived sulfonic acid group" means a group derived from a sulfonic acid group (—$SO_3H$), which is represented by the following formulas:

—$SO_3R_{12}$, —$SO_3X$ or —$SO_3NR_{13}R_{14}$,

In the formulas, $R_{12}$ is a hydrogen atom, a $C_1$ to $C_{10}$ alkyl group or a $C_6$ to $C_{10}$ aryl group, which groups may be substituted with or unsubstituted with an inert group; X is a halogen atom; and $R_{13}$ and $R_{14}$ are each a hydrogen atom, a $C_1$ to $C_{10}$ alkyl group or $C_6$ to $C_{10}$ aryl group, which groups may be substituted with or unsubstituted with an inert group.

Examples of the above-mentioned compounds (1) are olefins, liquid diene polymers and quinones. Specific examples thereof are olefins such as 1-dodecene and 1octadecene; liquid diene polymers such as liquid polybutadiene; and quinones such as 1,2-benzoquinone, 1,4-benzoquinone, 2,6-dimethylbenzoquinone, 2,6-diphenylbenzoquinone, tetramethylbenzoquinone, 2-chloro-1,4-benzoquinone, chloranil, 2,2'-diphenoquinone, 4,4'-diphenoquinone, 1,2-naphthoquinone, 1,4-naphthoquinone, 2,6-naphthoquinone and 9,10anthraquinone.

Examples of the above-mentioned compounds (2) are epoxy resins obtained by a condensation reaction of a compound selected from the group consisting of polyhydric phenols, polyhydric alcohols and amines with epichlorohydrin; epoxidized products of the above-mentioned liquid diene polymers; oxidized polyolefin waxes; and epoxy compounds such as octadecyl glycidyl ether and 1-hexadecene oxide.

Examples of the above-mentioned compounds (3) are succinic anhydride; maleic anhydride polymers such as styrene-maleic anhydride copolymer; methyl p-nitrobenzoate; and p-cyanophenylacetamide.

Examples of the above-mentioned compounds (4) are unsaturated dicarboxylic acids such as maleic acid, fumaric acid, chloromaleic acid, tetrahydrophthalic anhydride, citraconic acid and itaconic acid; unsaturated monocarboxylic acids such as acrylic acid, butanoic acid, crotonic acid, vinylacetic acid, methacrylic acid, pentenoic acid, dodecenoic acid, linolic acid, angelic acid and cinnamic acid; α,β-unsaturated dicarboxylic acid anhydrides and unsaturated monocarboxylic acid anhydrides such as maleic anhydride, tetrahydrophthalic anhydride, and acrylic anhydride; α,β-unsaturated dicarboxylic acid amides and unsaturated monocarboxylic acid amides such as maleic acid amide, maleic hydrazide, acrylic amide and N-(hydroxymethyl)acrylamide; α,β-unsaturated dicarboxylic acid esters and unsaturated monocarboxylic acid esters such as ethyl maleate; α,β-unsaturated dicarboxylic acid imides and unsaturated monocarboxylic acid imides such as maleimide; unsaturated epoxy compounds such as acryl glycidyl ether, glycidyl acrylate and glycidyl methacrylate; unsaturated amines such as allylamine, p-aminostyrene and N-vinylaniline; unsaturated alcohols such as allyl alcohol, 3-buten-2-ol and propargyl alcohol; alkenylphenols such as p-vinylphenol and 2-propenylphenol; organosilane compounds such as 2-(3-cyclohexenyl)ethyl trimethoxysilane, 1,3-divinyltetraethoxysilane, vinyltris-(2-methoxyethoxy) silane, 5-(bicycloheptenyl) triethoxysilane, γ-aminopropyl triethoxysilane and γ-mercaptopropyl trimethoxysilane; mercapto compounds such as 3-mercaptopropionic acid and 2-mercaptobenzimidazol; oxycarboxylic acid derivatives such as 2-hydroxyisobutyric acid, DL-tartaric acid, citric acid, malic acid, agaricic acid, ammonium hydrogen citrate, ammonium citrate, calcium citrate, calcium malate, potassium citrate, potassium malate, acetyl citrate, stearyl citrate, distearyl citrate, acetyl malate, stearyl malate, N,N'-diethylcitramide, N,N'-dipropylcitramide, N-phenylcitramide, N-dodecylcitramide, N,N'-didodecylcitramide and N-dodecylmalic amide; and acid halides such as halides of trimellitic anhydride, chloroformylsuccinic acid, chloroformylsuccinic acid anhydride, chloroformylglutaric acid, chloroformylglutaric acid anhydride and chloroacetylsuccinic acid.

A more preferred component (B) is a compound having a non-aromatic carbon-carbon multiple bond and a functional group (i) mentioned in the above (4), or the above-mentioned oxycarboxylic acid derivative. Among them, maleic acid, fumaric acid, acrylic acid, methacrylic acid, maleic anhydride, tetrahydrophthalic anhydride, glycidyl methacrylate, glycidyl acrylate, acrylamide, maleimide, allylamine, allyl alcohol, propargyl alcohol, citric acid or malic acid is much more preferred, and maleic anhydride or fumaric acid is the most preferred.

The component (B) is used in an amount of from 0.1 to 30 parts by weight, preferably from 0.2 to 20 parts by weight, and more preferably from 0.3 to 10 parts by weight, based on 100 parts by weight of the component (A). When said amount is less than 0.1 part by weight, it is difficult to improve a melt tension of the modified polypropylene resin obtained. When said amount exceeds 30 parts by weight, a large amount of the unreacted component (B) remains in the modified polypropylene resin obtained, and as a result, it is difficult to sufficiently improve its melt tension.

Examples of the "functional group reactive to a carboxyl group" in the component (C) are a hydroxyl group (—OH), a mercapto group (—SH), a derived amino group (—NHR) (in the formula, R is a hydrogen atom or an alkyl group, which group may be substituted with or unsubstituted with an inert group) and an isocyanate group (—N=C=O).

As the component (C), an organic compound represented by the following formulas can be exemplified:

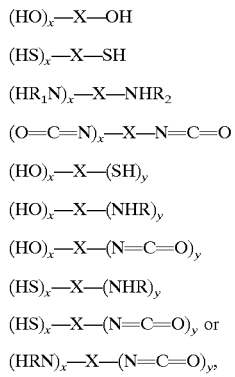

In the formulas, x and y are each an integer of not less than 1; $R_1$ and $R_2$ may be the same or different and are each a hydrogen atom or an alkyl group, which group mat be substituted with or unsubstituted with an inert group; X is a $C_7$ to $C_{30}$ alkylene group, which group mat be substituted with or unsubstituted with an inert group; and the "inert group" in $R_1$, $R_2$ and X means a thermally stable group such as aryl, halogen, cyano, nitro, carbonyl, sulfonyl, ether, sulfide, ester and amide groups.

As the component (C), diamino compounds represented by a formula, $HR_1N$—X—$NHR_2$, are preferred. Specific examples thereof are 1,6-diamino-2-ethylhexane, 1,7-diaminoheptane, 1,8diaminooctane, 1,9-diaminononane, 1,10-diaminodecane, 1,11-diaminoundecane, 1,12-diaminododecane, 1,12-bis(N,N'-dimethylamino)dodecane, 1,13-diaminotridecane, 1,14-diaminotetradecane, 1,15-diaminopentadecane, 1,16-diaminohexadecane, 1,17-diaminoheptadecane, 1,18-diaminooctadecane, 1,24-diaminotetracosane, 1,16-diamino-2,2-dimethyl-4methylhexane, bis(4-aminocyclohexyl)methane, bis(4-amino-3-methylcyclohexyl)methane, 2,2'-bis(4-aminocyclohexyl)propane and bis-hexamethylenetriamine. Of these, those having the formula, $HR_1N$—X—$NHR_2$ (wherein each of $R_1$ and $R_2$ is a hydrogen atom, and X is a linear chain alkylene group having 8 to 20 carbon atoms) are more preferred, and 1,12 diaminododecane is the most preferred.

The component (C) is used in an amount of from 0.001 to 30 parts by weight, preferably from 0.002 to 20 parts by weight, and more preferably from 0.005 to 10 parts by weight, based on 100 parts by weight of the component (A). When said amount is less than 0.001 part by weight, it is difficult to improve the melt tension of the modified polypropylene resin obtained. When said amount exceeds 30 parts by weight, a large amount of the unreacted component (C) remains in the modified polypropylene resin obtained, and as a result, it is difficult to sufficiently improve its melt tension.

A decomposition temperature of the component (D) at which temperature a half-life (in other word, "half-value period") thereof is 1 minute, is from 50 to 120° C., preferably prom 70 to 110° C., and more preferably from 80 to 100° C. When the decomposition temperature is lower than 50° C., the impact strength of the modified polypropylene resin obtained does not increase, and when it exceeds 120° C., the melt tension of the modified polypropylene resin obtained decreases.

As the component (D), preferable are organic peroxides which can decompose to generate a radical, and then can draw a proton from the polypropylene resin. Examples thereof are diacyl peroxide compounds, percarbonate compounds having the following structure (2) in its molecule, and alkyl perester compounds having the following structure (3) in its molecule. Among them, from a viewpoint of drawability of a proton, preferable are percarbonate compounds, and the most preferable is dicetyl peroxydicarbonate.

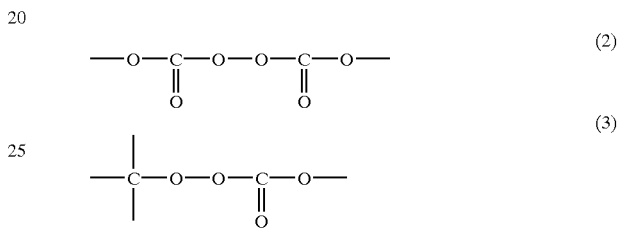

Specific examples of compounds having the above structure (2) are di-3-methoxybutyl peroxydicarbonate, di-2-ethylhexyl peroxydicarbonate, bis(4-t-butylcyclohexyl) peroxydicarbonate, diisopropyl peroxycarbonate, t-butyl peroxyisopropylcarbonate and dimyristyl peroxycarbonate.

Specific examples of compounds having the above structure (3) are 1,1,3,3-tetramethylbutyl neodecanoate, α-cumyl peroxyneodecanoate and t-butyl peroxyneodecanoate.

The component (D) is used in an amount of from 0.01 to 20 parts by weight, preferably from 0.02 to 15 parts by weight, and more preferably from 0.05 to 10 parts by weight, based on 100 parts by weight of the component (A). When said amount is less than 0.01 part by weight, it is difficult to improve the melt tension of the modified polypropylene resin obtained. Even if said amount exceeds 30 parts by weight, it cannot be expected to sufficiently improve its melt tension.

The components (A) to (D) may be used in combination with a polyolefin resin other than the polypropylene resin, an electron donor compound such as styrene and divinylbenzene, a nucleating agent or a crystallization promoter. Further, depending upon uses of the modified polypropylene resin obtained, the components may be used in combination with conventional substances generally added to a polyolefin resin (such as, for example, stabilizers including antioxidants, heat-resisting stabilizers, neutralizing agents and ultraviolet absorbers; bubble resisting agents; flame retarders; flame retarding auxiliaries; dispersants; antistatic agents; lubricants; anti-blocking agents such as silica; coloring agents such as dyes and pigments; and plasticizers), plate like or powder like inorganic compounds such as glass flake, mica, glass powder, glass beads, talc, clay, alumina, carbon black and wollastonite, and whiskers.

A method for mixing respective components used in the present invention is not particularly limited. The method may be a conventional method for mixing a resin and another resin, or a conventional method for mixing a solid or liquid additive and a resin. As a preferred mixing method, mixing methods carried out using mixing machines such as a Henschel mixer, a ribbon blender and a blender are exemplified.

As a method for kneading the above-mentioned mixture to allow the components to react with one another, methods carried out using kneading machines such as a Banbury mixer, a plastomil, a Brabender plastograph, a single screw extruder and a twin screw extruder are exemplified.

A preferable process for producing a modified polypropylene resin in accordance with the present invention it a process comprising the steps of:

(1) mixing the component (A), the component (B) and the component (D), and reacting them with one another to obtain a reaction mixture, and (2) mixing the reaction mixture with the component (C), and reacting with each other, thereby obtaining the modified polypropylene resin.

From a viewpoint of improvement of productivity, particularly preferable is a continuous process, wherein a mixture of the component (A), the component (B) and the component (D) is continuously supplied from a 1st inlet of a single or twin screw extruder and melt-kneaded; the component (C) is continuously supplied to the melt-kneaded mixture from a 2nd inlet thereof, which inlet is located at the downstream of the 1st inlet; and the resulting mixture is melt-kneaded to allow the components to react with one another.

A kneading temperature, which means a cylinder temperature when an extruder is used, is from 100 to 300° C., and preferably from 120 to 250° C. When the temperature is lower than 100° C., the impact strength and melt tension of the modified polypropylene resin obtained may not be improved. When the temperature exceeds 300° C., decomposition of the component (A) may occur.

A kneading time is from 0.1 to 30 minutes, and particularly preferably from 0.5 to 5 minutes. When the kneading time is shorter than 0.1 minute, the impact strength and melt tension of the modified polypropylene resin obtained may not be improved. When the kneading time exceeds 30 minutes, decomposition of the component (A) may occur.

The modified polypropylene resin obtained by the process in accordance with the present invention can be molded into a molded article, which can be suitably applied for various uses, according to a molding method such as extrusion molding, injection molding, vacuum molding and foam molding methods. As the foam molding method, an extrusion foam molding method with use of a volatile solvent or an inorganic gas and a chemical foam molding method with use of a thermally decomposabale blowing agent are exemplified.

EXAMPLE

The present invention is explained with reference to the following Examples, which are only illustrative and not intended to limit the scope of the present invention.

1. Components used
(1) A polypropylene resin having an intrinsic viscosity of 2.2 dl/g, measured at 135° C. Tetralin™ (tetrahydronaphthalene) using an Ubbellohde viscometer, an ethylene unit content of 0.6% by weight and a propylene unit content of 99.4% by weight (said polypropylene resin being hereinafter referred to as "A-1").
(2) Maleic anhydride (hereinafter referred to as "B-1").
(3) 1,12-Diaminododecane (hereinafter referred to as "C-1").
(4) Dicetyl peroxydicarbonate, whose temperature having a half-life of 1 minute is 99° C. (said compound being hereinafter referred to as "D-1"), (5) A mixture of 40 parts by weight of 1,3-bis(t-butyl peroxyisopropyl)benzene, whose temperature having a half-life of 1 minute is 183° C., and 60 parts by weight of the above-defined polypropylene resin (said mixture being hereinafter referred to as "D-2").

2. Evaluation Method
(1) Flexural modulus and flexural strength
Measured at 23° C. according to ASTM D790.
(2) Izod impact strength
Measured at 23° C. according to ASTM D256 using a notched sample (thickness=3.2 mm).
(3) Melt flow rate
Measured at 230° C. according to JIS K7210, Condition Number 14.
(4) Breaking extension
Measured at 23° C. according to ASTM D638,
(5) Melt tension
Measured using a melt tension-measuring machine manufactured by Toyoseiki under the following conditions.

| Orifice | L/D = 4 (D = 2 mm) |
| --- | --- |
| Pre-heating | 10 minutes |
| Extrusion rate | 5.7 mm/min |
| Drawing rate | 15.6 m/min |

(6) Heat distortion temperature
Measured under a load of 0.45 MPa according to ASTM D648.

Example 1

In the blending ratios as shown in Table 1, a mixture of the polypropylene resin, maleic anhydride and the organic peroxide was supplied from a 1st inlet of a twin screw extruder (cylinder diameter=50 mm, L/D=41), and the diamino compound was supplied from a 2nd inlet thereof. The resulting mixture was kneaded in said extruder at a cylinder temperature of 200° C. (a set temperature) and a screw rotating speed of 240 rpm, thereby obtaining a sample for evaluation use (pellet). Melt flow rate and melt tension of the pellet are as shown in Table 1.

The pellet was molded under the following conditions using an injection molding machine manufactured by Sunitomo Heavy Industries, Ltd. Flexural modulus, flexural strength, Izod impact strength, breaking extension and heat distortion temperature of the resulting molded article are as shown in Table 1.

| Clamping power | 50 t |
| --- | --- |
| Screw diameter | 32 mm |
| Cylinder temperature | 180° C. |
| Mold temperature | 50° C. |
| Back pressure | 42 MPa |

Comparative Example 1

Example 1 was repeated, except that the organic peroxide was changed from D-1 to D-2, and its blending proportion was changed from 0.5 part by weight to 0.125 part by weight. The results are as shown in Table 1.

TABLE 1

| Components | Example 1 | Comparative Example 1 |
|---|---|---|
| From 1st inlet | | |
| Component (A) | | |
| Kind | A-1 | A-1 |
| Amount (parts by weight) | 90 | 90 |
| Component (B) | | |
| Kind | B-1 | B-1 |
| Amount (parts by weight) | 2.0 | 2.0 |
| Component (D) | | |
| Kind | D-1 | D-1 |
| Amount (parts by weight) | 0.5 | 0.125 |
| From 2nd inlet | | |
| Component (A) | | |
| Kind | A-1 | A-1 |
| Amount (parts by weight) | 10 | 10 |
| Component (C) | | |
| Kind | C-1 | C-1 |
| Amount (parts by weight) | 1.5 | 1.5 |
| Evalutation result | | |
| Melt flow rate (g/10 min.) | 2.3 | 32 |
| Melt tension (mN) | 92 | 2 |
| Flexural modulus (MPa) | 1450 | 1360 |
| Flexural strength (MPa) | 42 | 40 |
| Breaking extention (%) | 970 | 930 |
| Izod impact strength (KJ/m$^2$) | 4.6 | 2.4 |
| Heat distortion temperature (° C.) | 113 | 109 |

What is claimed is:

1. A process for producing a modified polypropylene resin, which comprises the steps of mixing the following components (A) to (D), and reacting them with one another:
    (A) 100 parts by weight of a polypropylene resin,
    (B) 0.1 to 30 parts by weight of a compound having a bond or a functional group selected from the group consisting of a non-aromatic carbon-carbon multiple bond, an oxirane group and either a carboxyl group or a derived carboxyl group,
    (C) 0.001 to 30 parts by weight of a compound having at least two functional groups reactive to a carboxyl group, and
    (D) 0.01 to 20 parts by weight of an organic peroxide having a decomposition temperature of from 50 to 120° C., at which temperature a half-life of the organic peroxide is 1 minute,
    wherein the compound of the component (C) is a diamino compound represented by the following formula,

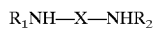

wherein $R_1$ and $R_2$ may be the same or different and are each a hydrogen atom or an alkyl group, which group, may be substituted with or unsubstituted with an inert group; and X is an alkylene group, which group may be substituted with or unsubstituted with an inert group.

2. The process for producing a modified polypropylene resin according to claim 1, wherein the component (D) contains a compound having a structure represented by the following formula (2):

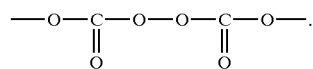

(2)

3. The process for producing a modified polypropylene resin according to claim 1, wherein the steps comprise:
    (1) mixing components (A), (B) and (D), and reacting them with one another to obtain a reaction mixture, and
    (2) mixing the reaction mixture with a component (C), and reacting with each other.

4. The process for producing a modified polypropylene resin according to claim 1, wherein the steps are carried out by melt-kneading in an extruder.

* * * * *